May 5, 1959

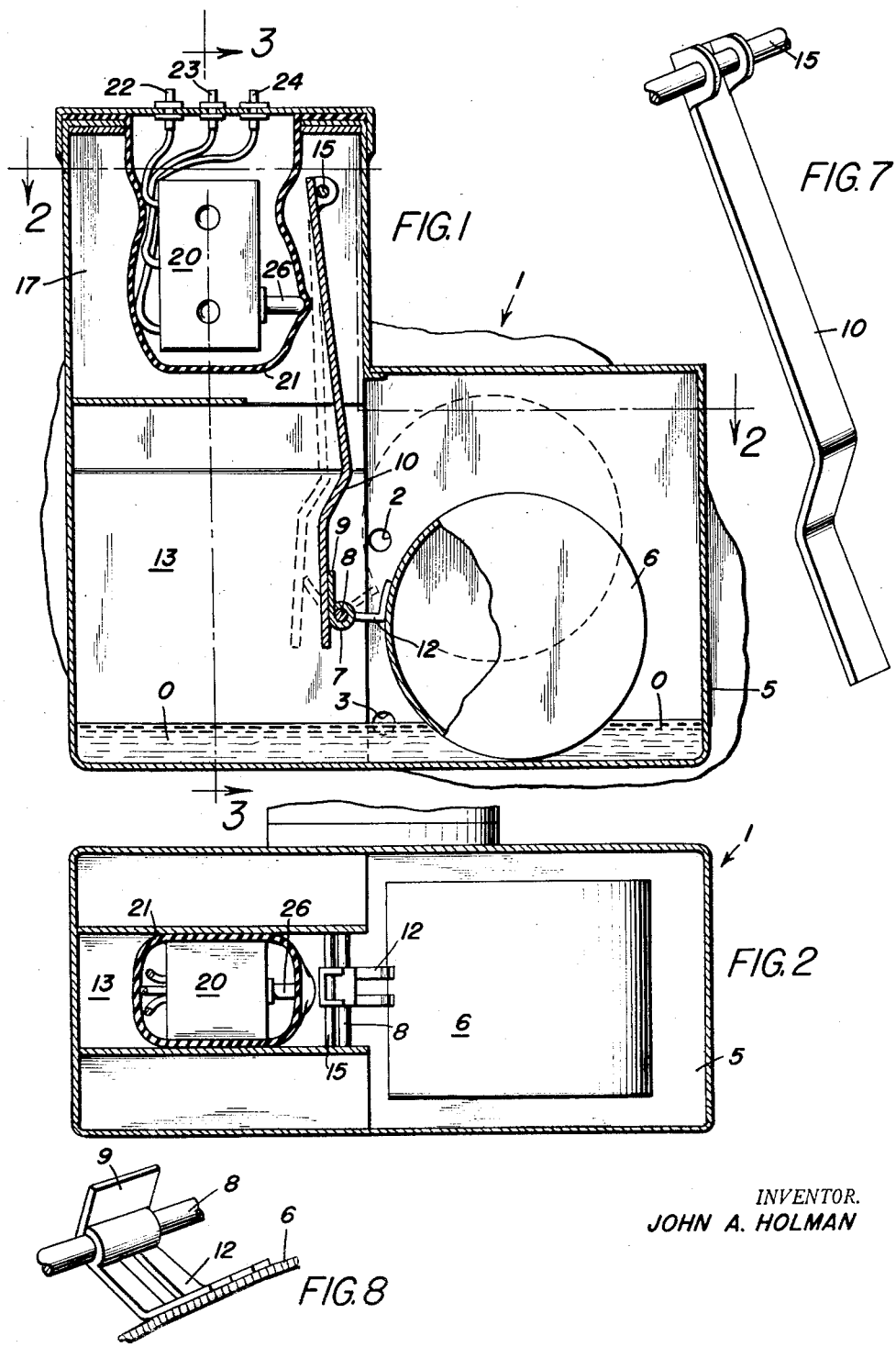

J. A. HOLMAN 2,885,507

LEVEL INDICATORS, AND MORE PARTICULARLY TO SYSTEMS
FOR INDICATING THAT THE LEVEL OF A LIQUID HAS
ATTAINED A PRE-DETERMINED VALUE

Filed June 18, 1957

INVENTOR.
JOHN A. HOLMAN

United States Patent Office 2,885,507
Patented May 5, 1959

2,885,507

LEVEL INDICATORS, AND MORE PARTICULARLY TO SYSTEMS FOR INDICATING THAT THE LEVEL OF A LIQUID HAS ATTAINED A PREDETERMINED VALUE

John A. Holman, Dallas, Tex.

Application June 18, 1957, Serial No. 666,394

3 Claims. (Cl. 200—84)

The present invention relates generally to level indicators, and more particularly to systems for indicating that the level of a liquid has attained a predetermined value.

It is a primary object of the present invention to provide a rapid circuit maker and breaker operative by a float, in which a body of liquid which supports the float does not contact the contacts or operating mechanism of the circuit maker and breaker, and in which fumes arising from the liquid do not affect the contacts.

It is a further broad object of the invention to provide a system for indicating when the oil in an automatic transmission of a vehicle reaches a dangerously low level.

A further object of the invention resides in the provision of a liquid level indicator which may be easily installed in the wall of a tank, either internally or externally, as through an internally threaded opening or other convenient device.

It is still another object of the invention to provide a system for indicating oil level of a vehicle transmission in which operation of the system takes place according to average oil level, and independently of short term changes in level or sloshing, due to vehicle movements.

The above and still further objects, features and advantages of the present invention will become apparent upon consideration of the following detailed description of one specific embodiment thereof, especially when taken in conjunction with the accompanying drawings, wherein:

Figure 1 is a view in vertical section of a device according to the present invention;

Figure 2 is a sectional view taken on the line 2—2 of Figure 1;

Figures 7 and 8 are details in perspective of certain lever arms.

Figure 3:
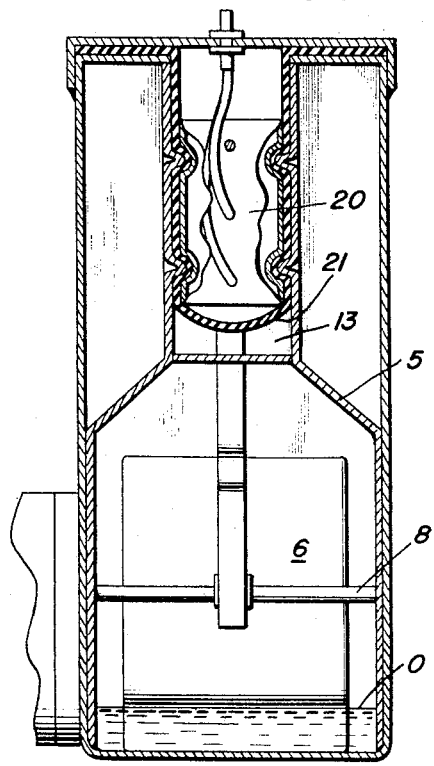
Figure 3 is a sectional view taken on the line 3—3 of Figure 1.

Referring now more particularly to the accompanying drawings, the reference numeral 1 denotes a device according to the invention, which may be secured internally or externally of a vehicle transmission housing, and which communicated therewith via two vertically spaced small apertures 2 and 3. The desired level of oil O in the device is intermediate the levels of the apertures 2 and 3. The apertures are sufficiently small that oil must seep into or out of the device 1 slowly, so that sloshing of oil will not disturb the operation of the system, but the average level in the device 1 will correspond to that in the housing.

The device 1 may be considered to be fabricated of three compartments, which are isolated from each other in considerable degree. The compartment 5 contains a float 6 which responds to liquid level. The float 6 is pivotally mounted on one arm of a bell crank 7, pivoted on a pivot 8, and having a further arm 9 which serves to actuate a switch actuator rod 10. The arm 12 of the bell crank 7 which supports float 6 largely subsists in compartment 5 and engages the float 6 as by being welded thereto, or in any other convenient fashion.

The arm 12 extends into a further compartment 13, wherein is supported pivot 8, and into which extends the switch actuator 10. The latter extends substantially vertically downward from a pivot 15. The pivot 15 is located within a compartment 17.

Within compartment 17 is a switch 20, which is sealed within a flexible walled bag or container 21, and which has leads 22, 23, 24 extending externally of the compartment 17.

The rod 10 presses against a pin 26, which forms part of switch 20 and serves to close and separate the contacts thereof, and does so via a wall of flexible bag or container 21. The switch 20 and all its parts and leads are thus totally insulated from the oil O normally contained in the bottom of compartments 5 and 13, and from fumes arising therefrom.

Figure 6:
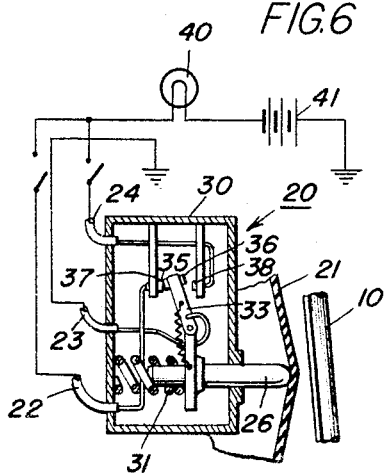
Figure 6 is a view in section of a circuit maker and breaker according to the invention.

In Figure 6 is illustrated a circuit diagram according to the invention, and the internal structure of switch 20.

The switch 20 includes a suitable casing 30, through which extends the pin 26. The latter is spring pressed outwardly by a helical spring 31, which is overcome by pressure of rod 10 when the float 16 rises to some predetermined level.

The pin 26 supports a toggle 33, which has on opposite sides thereof two contacts 35 and 36, and which has the known property of flipping very rapidly to either of its stable positions. A stationary contact 37 is supported from the casing 30, adjacent contact 35, and a further stationary contact 38 is supported from the casing 30 adjacent contact 36.

Contacts 35 and 36 are electrically connected to casing 30, which is in turn connected to ground via lead 23. Contacts 37 and 38 are via leads 22 and 24, respectively. Either of the latter may be connected in series with a signal lamp 40, and the battery 41 normally employed in motor vehicles, one terminal of the battery being grounded.

In operation, and assuming lead 22 is normally connected to signal lamp 40, when float 6 falls sufficiently, pressure is removed from pin 25, and contacts 35, 37 close, completing a circuit for the signal lamp 40. It will be clear that other electrically operated signal devices may be employed, such as bells, buzzers or the like.

Figure 4:
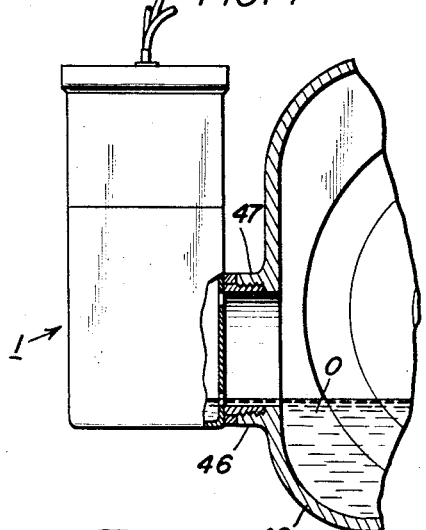
Figure 4 is a view partly in side elevation and partly broken away and showing a system according to the invention mounted externally of a vehicle transmission casing.

In Figure 4 is illustrated generally a transmission housin 45, having a boss 46 which is internally threaded at 47, the device 1 threadedly engaging the internal threads 47.

Figure 5:
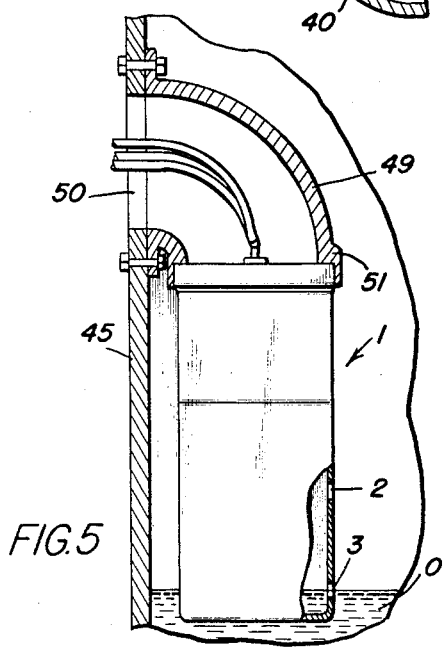
Figure 5 is a view partly in section and partly in elevation of a system according to the present invention, mounted internally of a vehicle transmission casing.

In Figure 5 the device 1 is shown located internally of a transmission housing 45, being supported by an elbow 49, one end of which is secured to an opening 50 in the housing, and the other end, 51, of which supports the device 1.

Figures 4 and 5 thus illustrate alternative mounting schemes for the device of the invention.

While the float 6 has been illustrated as contained in compartment 5, this does not go to the essence of my invention, but float 6 may be located in compartment 13, and provided with suitable linkage for actuating rod 10, and such arrangement will reduce the volume of my device.

While I have described and illustrated one specific embodiment of my invention, it will be clear that variations of the details of construction which are specifically illustrated and described may be resorted to without departing from the true spirit and scope of my invention as defined in the appended claims.

What I claim is:
1. A system for indicating when the level of liquid in a housing has attained a predetermined critical level, comprising means for securing access to said housing including an aperture in said housing encompassing said critical level, a container secured to said housing and having two openings communicating with said aperture, one of said openings being below said critical level and the other of said openings being above said critical level, a two position circuit maker and breaker within said container, said circuit maker and breaker being of toggle operated type having rapid make and break characteristics, and including a movable contact movable to two positions between two stationary contacts, a rod for actuating said movable contact of said circuit maker and breaker from other of its two positions to the other on attainment, respectively, of two different predetermined positions of said rod, a flexible protective oil-tight covering for said circuit maker and breaker and said rod, a float supported by said liquid, and mechanical linkage located externally of said covering and intermediate said float and said rod for imparting one of said predetermined positions to said rod via said covering when said liquid attains a predetermined critical level and the other of said predetermined positions to said rod when said liquid attains a level greater than said predetermined critical level; a source of voltage having a grounded terminal and an ungrounded terminal, an indicator having one terminal connected to the ungrounded terminal of said source and having a further terminal, a connection between said movable contact and ground, separate circuits from said stationary contacts to said further terminal of said indicator, and a separate switch in each of said circuits.

2. The system according to claim 1, wherein said container is located internally of said housing.

3. The system according to claim 1, wherein said container is located externally of said housing.

References Cited in the file of this patent
UNITED STATES PATENTS

| | | |
|---|---|---|
| 2,194,533 | Van Dyke | Mar. 26, 1940 |
| 2,684,414 | Kilpatrick | July 20, 1954 |
| 2,786,914 | Storck et al. | Mar. 26, 1957 |

FOREIGN PATENTS

| | | |
|---|---|---|
| 130,781 | Australia | Nov. 28, 1946 |